Figure 1:
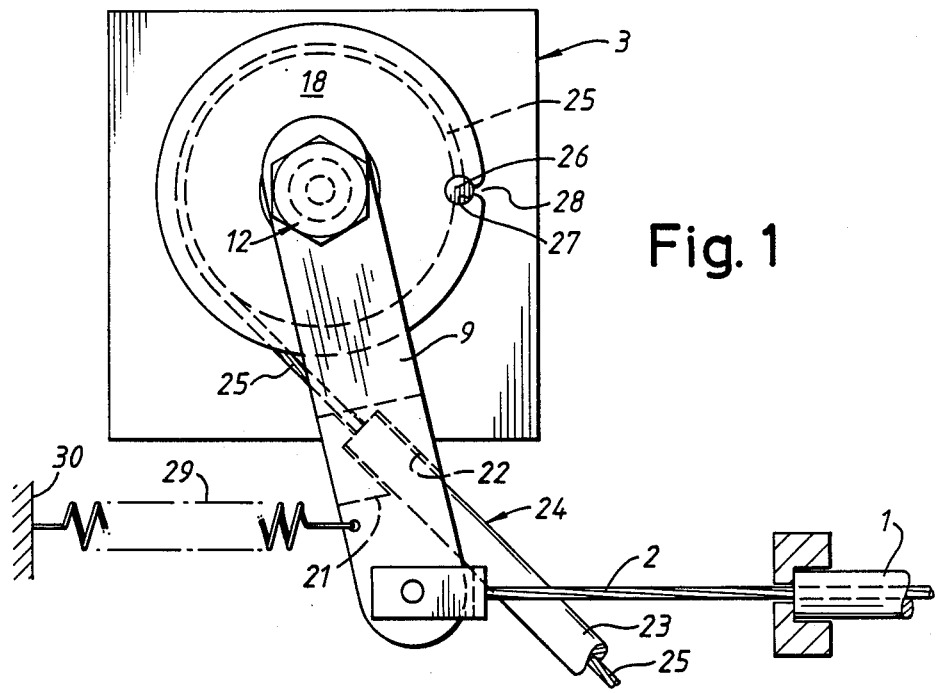

United States Patent [19]

Michell

[11] Patent Number: 4,771,847
[45] Date of Patent: Sep. 20, 1988

[54] SPEED CONTROL ACTUATOR

[75] Inventor: David V. Michell, Fife, Scotland

[73] Assignee: Veeder-Root Limited, Warley, England

[21] Appl. No.: 925,253

[22] Filed: Oct. 31, 1986

[30] Foreign Application Priority Data

Nov. 1, 1985 [GB] United Kingdom ............... 8526953

[51] Int. Cl.⁴ .............................................. B60K 31/04
[52] U.S. Cl. ..................................... 180/179; 123/376
[58] Field of Search ............... 180/170, 174, 178, 179; 123/376, 400, 342

[56] References Cited

U.S. PATENT DOCUMENTS

| | | | |
|---|---|---|---|
| 4,337,839 | 7/1982 | Taplin | 180/179 |
| 4,397,276 | 8/1983 | Hagashida | 123/376 |
| 4,543,932 | 10/1985 | Sturdy | 123/376 |

FOREIGN PATENT DOCUMENTS

| | | |
|---|---|---|
| 0020860 | 1/1981 | European Pat. Off. . |
| 0114748 | 8/1984 | European Pat. Off. . |
| 3106628 | 12/1981 | Fed. Rep. of Germany . |
| 3237523 | 4/1984 | Fed. Rep. of Germany . |
| 0172828 | 10/1982 | Japan .................... 180/176 |
| 2009463 | 6/1979 | United Kingdom . |

Primary Examiner—John J. Love
Assistant Examiner—Richard Camby
Attorney, Agent, or Firm—Chilton, Alix & Van Kirk

[57] ABSTRACT

The speed control actuator can be used to modify a control linkage fitted between an accelerator pedal and a carburetor or fuel injection pump on a vehicle engine. The actuator includes a forked lever which is mounted for rotation on the shaft of the fuel regulator, and a pulley which is mounted for rotation relative to the forked lever. The accelerator pedal is connected by means of a cable to the forked lever. Another cable passes over the pulley and is connected to a microprocessor controlled cable drive. The cable is advanced and retracted, in accordance with a vehicle speed related signal, to adjust the fuel regulator independently of the accelerator pedal. A preferred form of drive means is also described which employs a microprocessor producing a speed-related output in the form of a pulsating current of one polarity or another, and having a variable mark-to-space ratio, for driving a dc motor coupled to the actuator.

10 Claims, 2 Drawing Sheets

SPEED CONTROL ACTUATOR

This invention relates to a speed control actuator. The actuator can be generally used in a control system where the speed of an output shaft, driven by an engine or motor, needs to be maintained at a substantially constant value whilst the load applied to the engine or motor varies. The actuator is particularly useful in the field of vehicle speed control where a control linkage which normally connects an acceleration control to a fuel regulator for regulating the speed of an engine, is shortened or lengthened to modify the effect of the normal acceleration control. In the latter case, the actuator may be part of a throttle linkage which connects an accelerator pedal to a fuel injection pump or carburetor, the actuator being driven by means responsive to vehicle speed whereby the vehicle speed can be prevented from exceeding a predetermined value. However, the invention can also be applied to static engines which are subjected to varying loads.

In conventional vehicle speed control systems, the control linkage (i.e. throttle linkage) needs to be cut in order to insert the actuator. The actuator is driven by an output from the means responsive to vehicle speed so as to adjust the length of the control linkage. As long as the vehicle speed does not exceed a first predetermined value, the actuator remains inoperative. However, if the first predetermined value is exceeded, the actuator shortens the control linkage. This causes less fuel to be supplied to the engine of the vehicle and the vehicle speed starts to fall. When the vehicle speed falls below a second predetermined value, the actuator lengthens the control linkage. This again enables more fuel to be supplied to increase the vehicle speed. The first and second predetermined values are separated by an amount which determines a "dead band" in which the length of the control linkage is not adjusted. The aim is to reach a vehicle speed within the dead band so as to avoid making continued small adjustments to the fuel regulator in the proximity of a maximum or legal speed limit. The dead band may be narrow if the frequency and speed at which the adjustments are made is high. Alternatively, the dead band may be wide if the frequency and speed of adjustment is low. The choice of dead bandwidth and the frequency and speed of adjustment depends on the characteristics of the vehicle (which can differ from vehicle to vehicle) and on other factors such as the load carried by the vehicle, the terrain over which the vehicle is travelling, etc. The designer of a speed control system must take these factors into account in order to achieve optimum vehicle performance.

Instead of shortening the control linkage to reduce the amount of fuel supplied to the engine and lengthening the control linkage to enable more fuel to be supplied to the engine, some systems may operate in the reverse manner. The control system can otherwise operate in the same manner.

A particular disadvantage of the conventional system is that the throttle linkage must be cut in order to install the actuator. This problem is aggravated by the wide variety of ways in which commercial vehicle engines are mounted on in which throttle linkages are fitted. Such variations therefore necessitate the use of a multiplicity of different actuator installation kits. One of the objects of the invention is to provide an actuator which can be simply fitted to the fuel regulator without cutting the existing throttle linkage.

More particularly, the present invention provides a speed control actuator for modifying a control linkage which normally connects an acceleration control to a fuel or energy regulating member, said member being part of a regulator which is provided for regulating the amount of fuel or energy supplied to an engine or motor, characterised in that the actuator comprises first and second means adapted for respective connection to the acceleration control and to said fuel regulating member, said second means being arranged to move together with said first means to enable the fuel regulating member to be operated by said acceleration control, but said second means being capable of movement independently of said first means for adjusting the position of the fuel regulating member whereby the amount of fuel or energy supplied to the engine or motor can be regulated independently of the acceleration control.

The invention may be applied to a stationary engine for simply controlling its speed, or it may be applied to an engine fitted to a vehicle, i.e. as part of a vehicle speed control system. The invention may also be applied to an electrical motor.

When the invention is applied to a vehicle speed control system, the actuator may be coupled to a regulator of the type which includes a shaft that rotates in order to regulate the amount of fuel or energy supplied to an engine or motor. For example, in a carburetor, the shaft operates a butterfly valve. With such a regulator, a lever is normally fitted to the shaft and one end of the lever is coupled to the accelerator pedal of the vehicle by means of a Bowden cable or rod linkage. Such a control linkage can be modified by first removing the conventional lever and by fitting an actuator in accordance with a preferred embodiment of the invention. This preferred form of actuator comprises a forked lever, which is mounted for rotation with respect to the shaft of the regulator, and a pulley which is fast with the shaft but mounted for rotation relative to the forked lever. The cable or rod linkage connected to the accelerator pedal is connected to the forked lever. Another and quite separate or second cable passes over part of the pulley. An outer cover of this second cable is anchored to the forked lever so that the second cable, the pulley and the forked lever rotate together, as a unit, in order to adjust the position of the shaft when the accelerator pedal is operated. However, the second cable can be moved relative to the forked lever, e.g. in response to a vehicle speed control input, so that the pulley rotates independently of the lever for adjusting the position of the shaft independently of the accelerator pedal. This enables the speed of the vehicle to be limited to a predetermined value, e.g. within a given dead band.

Figure 2:
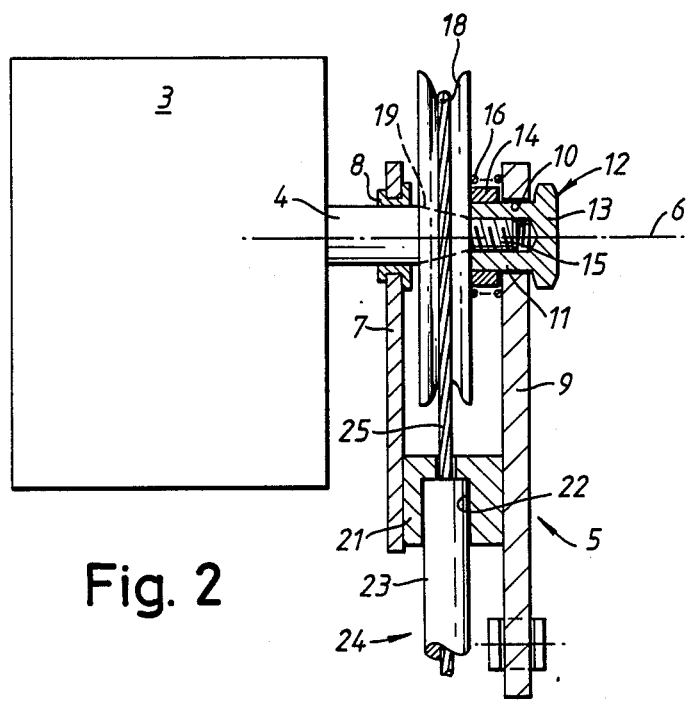
Figure 3:
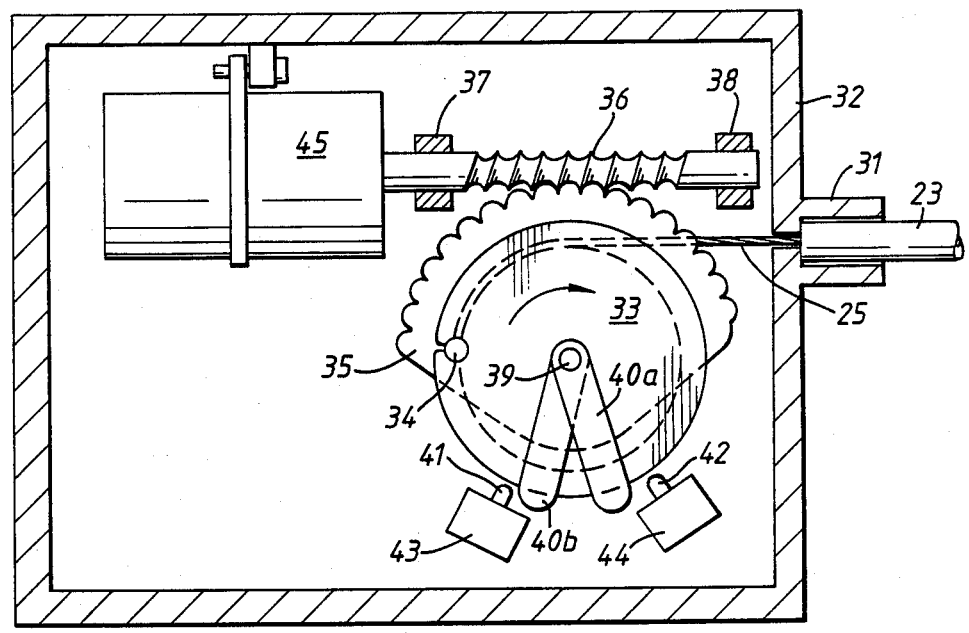
Figure 4:
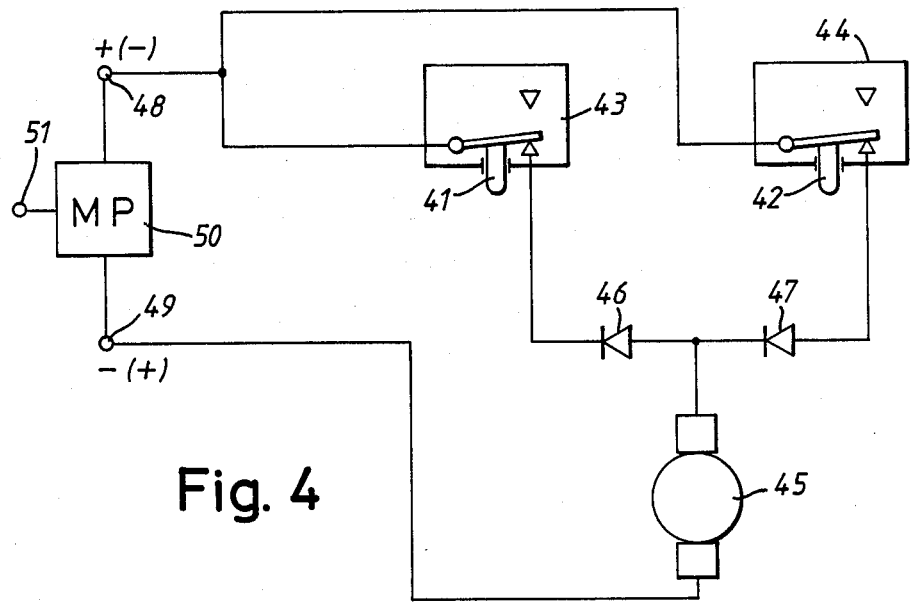

The preferred embodiment of the invention will now be described with reference to the accompanying schematic drawings, in which FIG. 1 is a side elevation showing an actuator fitted between a fuel regulator and one end of an accelerator control cable, FIG. 2 is an end elevation of the same components, some of which are shown in section, FIG. 3 illustrates means responsive to vehicle speed for driving the actuator, and FIG. 4 illustrates a circuit for limiting rotation of a motor used in the drive means shown in FIG. 3.

Referring to FIGS. 1 and 2, a throttle control linkage comprises an outer cover 1 and an inner cable 2, the inner cable being connected to an acceleration control (not shown) such as an accelerator pedal. The cable 2 moves relative to the outer cover 1 when the accelerator pedal is operated.

A fuel regulator 3, such as a fuel injection pump or carburettor, has a shaft 4 which is connected to means (not shown) within the regulator for controlling the amount of fuel supplied to a vehicle engine (not shown). The shaft 4 rotates in one direction to increase the fuel supply and it rotates in the other direction to decrease the fuel supply.

A forked lever 5 is mounted on shaft 4 so that it is capable of rotating, together with shaft 4, about an axis 6. The forked lever 5 has an arm 7 which is fitted with a bearing at 8 for supporting shaft 4 for rotatable movement. It also has an arm 9 with an aperture 10. A nut 12 has a head 13 to retain arm 9 and it has a shouldered portion 11 which passes freely through aperture 10. The forked lever 5 is thereby mounted for rotation onto the threaded portion 15 of shaft 4 to secure the pulley 18 onto the shaft 4 whereby rotational forces applied to the pulley 18 are transmitted to the shaft 4.

A torsional coil spring 16 surrounds a spacer 14 and is connected between arm 9 and the pulley 18. The spring 16 applied a rotational force between arm 9 and pulley 18 to ensure that the Bowden cable 25 is held under tension at all times.

Arm 7 is joined rigidly to arm 9 by a bridging member 21. Member 21 has a counterbore 22 for receiving the end of an outer cover 23 of a Bowden cable 24. An inner cable 25 is slidably received in the outer cover 23 and its end portion is entrained about an arcuate section of the pulley 18 (as shown in FIG. 1). The end of cable 25 terminates in a nipple 26 which is located in an aperture 27 passing through the sides of the pulley 4. A slot 28 enables the nipple 26 and cable 25 to be fitted into aperture 27. The inner cable 25 moves relative to the outer cover 23 in response to a drive provided by the means shown in FIG. 3 (and described in detail below). When the inner cable 25 is not so driven, it forms a substantially rigid link together with the anchorage of outer cover 23 on the bridging member 21, between the pulley 18 and forked lever 5.

A tension spring 29 connects the forked lever 5 to a stationary part 30 on the vehicle engine. Spring 29 maintains the throttle cable 2 in a taut condition.

Under normal condition, i.e. when a predetermined vehicle speed has not been exceeded the forked lever 5, pulley 18 and Bowden cable 24 rotate together as a solid linkage (due to the rigidity of the inner cable 25 and the anchorage of the outer cover 23 on the bridging member 21). Thus, when the accelerator pedal is operated, the inner cable 2 moves and thereby causes the forked lever 5 to rotate shaft 4 in either a clockwise, or anticlockwise direction. Under these circumstances, the driver of the vehicle has direct control over the fuel regulator 3.

When a first predetermined vehicle speed has been exceeded, the inner cable 25 moves relative to the outer cover 23 and thereby causes pulley 18 to rotate independently of the forked lever 5. The effect of this is to rotate shaft 4 in such a way as to reduce the amount of fuel supplied to the vehicle engine. Therefore, even if the driver further depresses the accelerator pedal, the vehicle speed will not increase above the first predetermined value. Normally, the vehicle speed starts to fall soon after the inner cable 25 has been extended relative to outer cover 23. When the vehicle speed falls below a second predetermined value, the inner cable is retracted relative to outer cover 23 and the pulley 18 rotates in the opposite direction to enable more fuel to be supplied to the vehicle engine. These first and second predetermined values determine the limits of the dead band in the control system. This will now be described in more detail with reference to FIGS. 3 and 4.

FIG. 3 schematically illustrates means for driving the cable 25 of the speed control actuator. The other end of the outer cover 23 of Bowden cable 24 is located in a spigot 31 on the side of a housing 32. The other end of the inner cable 25 is entrained about an arcuate section of a pulley 33 (similar in construction to pulley 18) and is similarly secured by means of a nipple 34. Pulley 33 is fast with a toothed quadrant 35 which meshes with a worm gear 36 which is supported in spaced bearings 37, 38. The pulley 33 and quadrant 35 are mounted for rotation on a shaft 39. Cam arms 40a and 40b are pivotally mounted on shaft 39 and their rotary positions, with respect to the shaft, can be adjusted and secured by means of a clamping screw (not shown). The remote end of each arm 40a, 40b acts as a cam for opening respective push buttons 41,42 on normally closed microswitches 43, 44. These microswitches act as limiting switches for limiting operation of a motor 45 which drivably rotates worm gear 36.

As shown in FIG. 4, the microswitches are connected by oppositely poled diodes 46, 47 to motor 45. Terminals 48, 49 are respectively provided with positive and negative direct current, or vice-versa, from a microprocessor 50. The microprocessor 50 is preferably located within the casing of a tachograph (not shown), for example, a techograph of the kind described in our copending application No.: 85301191.4.

Microprocessor 50 has an input 51 for receiving a signal from means (not shown) responsive to vehicle speed. Such means for providing a vehicle speed related signal are of conventional construction and require no detailed explanation. The microprocessor 50 is programmed so as to provide a speed-related ouput for driving cable 24. If the first predetermined vehicle speed value is exceeded, the microprocessor 50 provides current of one polarity (i.e. pulsating d.c. see below) to terminals 48, 49. When the vehicle speed drops below a second predetermined value, the microprocessor then supplies current of the reverse polarity (i.e. pulsating d.c. see below) to terminals 48, 49. In either case, the voltage of the speed related-related output of microprocessor 50 is proportional to an integrated value of vehicle speed. In other words, the voltage is proportional to vehicle acceleration (or deceleration). As the speed of the motor 45 is proportional to voltage the motor rotates faster when the vehicle accelerates (or decelerates) at a higher rate. This enables the speed control system to react more quickly to a rapid change of vehicle speed.

Certain conventional control systems employ control signals where the voltage changes in an analogue fashion to control the speed of an electric motor for driving an actuator. However, this form of control is not readily adapted for use with a microprocessor. This problem is solved, in the preferred embodiment of the invention, by using a digital speed related signal to vary the mark-space ratio of a pulsating output that is supplied to the means (see FIG. 3) for driving the actuator. For example, a sensor onboard the vehicle senses vehicle speed and provides a digital speed related signal. The sensor can be of conventional construction and hence requires no detailed description. The microprocessor 50 is programmed so as to determine vehicle speed and acceleration (or deceleration), on the basis of the digital output of the vehicle speed sensor, and to provide a pulsating output (of positive or negative polarity as explained above) where the pulse width is proportional to vehicle acceleration (or deceleration). For example, the pulse width increases the faster the vehicle accelerates (or decelerates), and vice versa, and hence the mean voltage level is proportional to acceleration (or deceleration). The object is to produce an output for driving the actuator such that the vehicle speed smoothly approaches and enters the dead band under normal driving conditions and such that continuous adjustments of the fuel regulator are minimised as far as possible.

The operation of the preferred embodiment of the invention will be clearer from the following example.

Assuming that the vehicle is accelerating and has exceeded the first predetermined speed value, direct current is supplied to terminals 48, 49 with the polarity shown in FIG. 4. This current is supplied to motor 45 via normally closed microswitch 43 and diode 47. The motor thereby drives worm gear 36 so that quadrant 35 rotates in a clockwise direction. This causes inner cable 25 to advance with respect to its outer cover 23 so as to cause pulley 18 to rotate in a clockwise direction (see FIG. 1). This in turn causes a reduction in the amount of fuel supplied to the engine of the vehicle and its rate of acceleration decreases. The voltage of the direct current supplied to terminals 48, 49 therey drops causing a reduction in the speed of motor 45. When the vehicle stops accelerating, the voltage applied to terminals 48, 49 falls to a value at which the motor 45 stops rotating whereby no further speed regulation is applied between the normal throttle control linkage and the fuel regulator 3. However, in the case of a particularly high overshoot of the predetermined maximum vehicle speed (e.g. which can happen when the vehicle descends a hill), the cam arm 40a rotates sufficiently to contact the push button of normal closed microswitch 43, whereupon the switch opens and cuts off the supply of current to motor 45, thereby avoiding any damage.

Normally, the vehicle speed starts to fall soon after cable 25 has been advanced due to rotation of motor 45 in the clockwise direction. As the vehicle speed falls below a second predetermined maximum vehicle, direct current of the opposite polarity is supplied to terminals 47, 48. The voltage applied to terminals 48, 49 depends on the rate of voltage deceleration. The motor 45 receives the current via normally closed microswitch 44 and diode 46. Motor 45 is thereby driven in the opposite direction to cause cable 25 to be retracted and hence pulley 18 to be rotated in the anticlockwise direction. This process will continue, as long as the vehicle speed is below the second predetermined value, until the cam arm 40b contacts the push button or normally closed microswitch 44. The switch then opens and cuts off the supply of current to motor 45. The system will always return to this "starting position" whenever the vehicle speed remains below the second predetermined value.

Under normal operation, when the vehicle is driven at a speed in the proximity of the predetermined maximum value, the speed control system will settle on a mean balance point within the dead band whereby the average vehicle speed is at or just below a predetermined maximum value. In general, the system provides a proportional type of speed control which depends on both vehicle speed and acceleration (or deceleration).

The concept of deriving a pulsating output having a mark-to-space ratio which is varied to provide a variable mean voltage for controlling the speed of an electric motor, the motor being driven in one direction or the other to modify the control linkage which normally connects an acceleration control to a fuel or energy regulating member, can be applied to a speed control actuator other than the preferred form of actuator described herein. This concept may employ direct pulsating current of one polarity, or another (as described above), or some alternative means for driving an electric motor in forward and reverse directions to achieve the same end. However, the concept preferably employs a digital speed-related input signal.

Instead of using a microprocessor, the speed control system could be controlled by analogue circuitry.

Whilst a preferred embodiment of the invention has been described in detail, modifications and changes are possible within the scope of the invention.

I claim:

1. A rotary, speed control actuator connecting two separate speed controllers for rotation of a rotary drive which is rotatable for regulating the amount of fuel or energy supplied to an engine or motor, said rotary actuator comprising two independently rotatable, coaxial rotary members mounted coaxial with said rotary drive with a first of said rotary members fixed to the rotary drive, a second of said rotary members connected to a first of said separate controllers for controlling the angular position of said second rotary member with said first controller, and an operating cable having an outer cover fixed to one of said coaxial rotary members and an inner cable shiftable within said outer cover and having an outer end extending beyond said outer cover and fixed to the other of said coaxial rotary members, the outer end of said inner cable forming a link between said rotary members which is sufficiently rigid to angularly position said first rotary member with said second rotary member, said operating cable being connected to a second of said separate controllers to shift the inner cable within the outer cover to angularly position said first rotary member relative to said second rotary member.

2. An actuator according to claim 1 wherein said second rotary member comprises first and second arms and a bridging member connected therebetween, and wherein said arms are adapted to be mounted for rotary movement with respect to said rotary drive, said first rotary member being located between said first and second arms.

3. An actuator according to claim 2, wherein said first rotary member is a pulley, and wherein said cable cover is fixed to said bridging member and said inner cable is at least partly entrained about said pulley.

4. An actuator according to claim 3 further comprising a second operating cable connected to said first arm for connecting said first arm to said first controller and a spring interposed between said first arm and said frist rotary member to tension said second cable.

5. An actuator according to claim 4 further comprising a hollow member adapted to be secured to said rotary drive to retain said first arm, said first arm being rotatably supported by said hollow member.

6. A vehicle speed control system comprising:
(a) a fuel or energy regulator having a rotary shaft which is rotatable for regulating the amount of fuel or energy supplied to an engine or motor of a vehicle;

(b) an acceleration controller;

(c) an actuator comprising an arm rotatably mounted coaxial with said shaft and connected to said acceleration controller to be angularly positioned thereby, a rotary member mounted on said shaft for rotation therewith, a Bowden cable having an outer cover connected to said arm and an inner cable shiftable within said outer cover, said inner cable being connected to said rotary member for angularly positioning said rotary member relative to said arm by shifting said inner cable within the outer cover;

(d) circuitry means to provide a vehicle speed-related output for limiting the vehicle speed to a predetermined value, and (e) a drive motor connected to be operated by said speed-related output and connected to shift said inner cable within said outer cover; said rotary member being connected to said inner cable to be angularly positioned with said arm to rotate said shaft with said acceleration controller and to angularly adjust said rotary member relative to said arm by said Bowden cable to adjust the amount of fuel or energy supplied to the engine or motor of the vehicle independently of said acceleration controller when the vehicle speed exceeds said predetermined value.

7. A vehicle speed control system according to claim 6 wherein said circuitry means comprises means for producing a pulsating output having a mark-to-space ratio which is varied to provide a variable mean voltage for controlling the speed of said drive motor.

8. A vehicle speed control system according to claim 7 wherein said circuitry means comprises a microprocessor which determines vehicle speed and acceleration on the basis of a digital speed-related input and which provides a vehicle speed-related output for said drive motor.

9. A vehicle speed control system according to claim 6 wherein the speed-related output is a direct current of one polarity or the other for causing the drive motor to rotate in respective forward and reverse directions when the vehicle respectively accelerates or decelerates.

10. A vehicle speed control system according to claim 6 wherein the motor is driven when the vehicle speed exceeds a first predetermined value, or falls below a second predetermined value, said first and second values defining limits of a dead band in which no adjustments of the actuator are made.

* * * * *